US012621660B2

(12) United States Patent
Kunz et al.

(10) Patent No.: US 12,621,660 B2
(45) Date of Patent: May 5, 2026

(54) KEY IDENTIFICATION FOR MOBILE EDGE COMPUTING FUNCTIONS

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 18/264,744

(22) PCT Filed: Feb. 8, 2022

(86) PCT No.: PCT/IB2022/051087
§ 371 (c)(1),
(2) Date: Aug. 8, 2023

(87) PCT Pub. No.: WO2022/168054
PCT Pub. Date: Aug. 11, 2022

(65) Prior Publication Data
US 2024/0129723 A1 Apr. 18, 2024

Related U.S. Application Data

(60) Provisional application No. 63/147,148, filed on Feb. 8, 2021.

(51) Int. Cl.
*H04W 12/041* (2021.01)
*H04W 12/06* (2021.01)
*H04W 60/00* (2009.01)

(52) U.S. Cl.
CPC ......... *H04W 12/041* (2021.01); *H04W 60/00* (2013.01)

(58) Field of Classification Search
CPC .... H04W 12/041; H04W 60/00; H04W 12/06
See application file for complete search history.

(56) References Cited

U.S. PATENT DOCUMENTS 12,107,950 B2 * 10/2024 De Kievit ............. H04L 9/0838
2021/0168594 A1 * 6/2021 Wu ........................ H04W 88/16
(Continued)

OTHER PUBLICATIONS

PCT/IB2022/051087, "Notification of Transmittal of the International Search Report and the Written Opinion of the International Searching Authority, or the Declaration", International Searching Authority, May 3, 2022, pp. 1-13.
(Continued)

*Primary Examiner* — Andrew Suh
(74) *Attorney, Agent, or Firm* — Kunzler Needham & Hilton

(57) ABSTRACT

Various aspects of the present disclosure relate to key identification for mobile edge computing functions. An apparatus includes at least one memory and at least one processor that is configured to generate a unique key set identifier ("KSI") associated with a multi-access edge computing ("MEC") service, derive a key for a network function based on a corresponding root key and the generated KSI, the KSI provided as input to a key derivation function ("KDF"), and transmit an application registration request message to the network function for establishing a secure connection to the network function using the key, the application registration request message comprising the KSI.

20 Claims, 7 Drawing Sheets

(56) References Cited

U.S. PATENT DOCUMENTS

2022/0303767 A1* 9/2022 Guo ..................... H04W 12/72
2022/0312206 A1* 9/2022 Gou ................... H04W 12/068

OTHER PUBLICATIONS

Lenovo et al., "Update of Solution #7", 3GPP TSG-SA3 Meeting #102e S3-210430, Jan. 18-29, 2021, pp. 1-7.
Lenovo et al., "Resolution of Editor's Notes in Solution#7", 3GPP TSG-SA3 Meeting #102Bis-e S3-211023, Mar. 1-5, 2021, pp. 1-6.
3GPP, "3rd Generation Partnership Project; Technical Specification Group Services and System Aspects; Study on Security Aspects of Enhancement of Support for Edge Computing in 5GC (Release 17)", 3GPP TR 33.839 V0.3.0, Nov. 2020, pp. 1-54.
3GPP, "3rd Generation Partnership Project; Technical Specification Group Core Network and Terminals; Numbering, addressing and identification; (Release 17)", 3GPP TS 23.003 V17.0.0, Dec. 2020, pp. 1-142.
3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.
3GPP, "3rd Generation Partnership Project; Technical Specification Group Services and System Aspects; Security architecture and procedures for 5G system (Release 17)", 3GPP TS 33.501 V17.0.0, Dec. 2020, pp. 1-253.

* cited by examiner

500

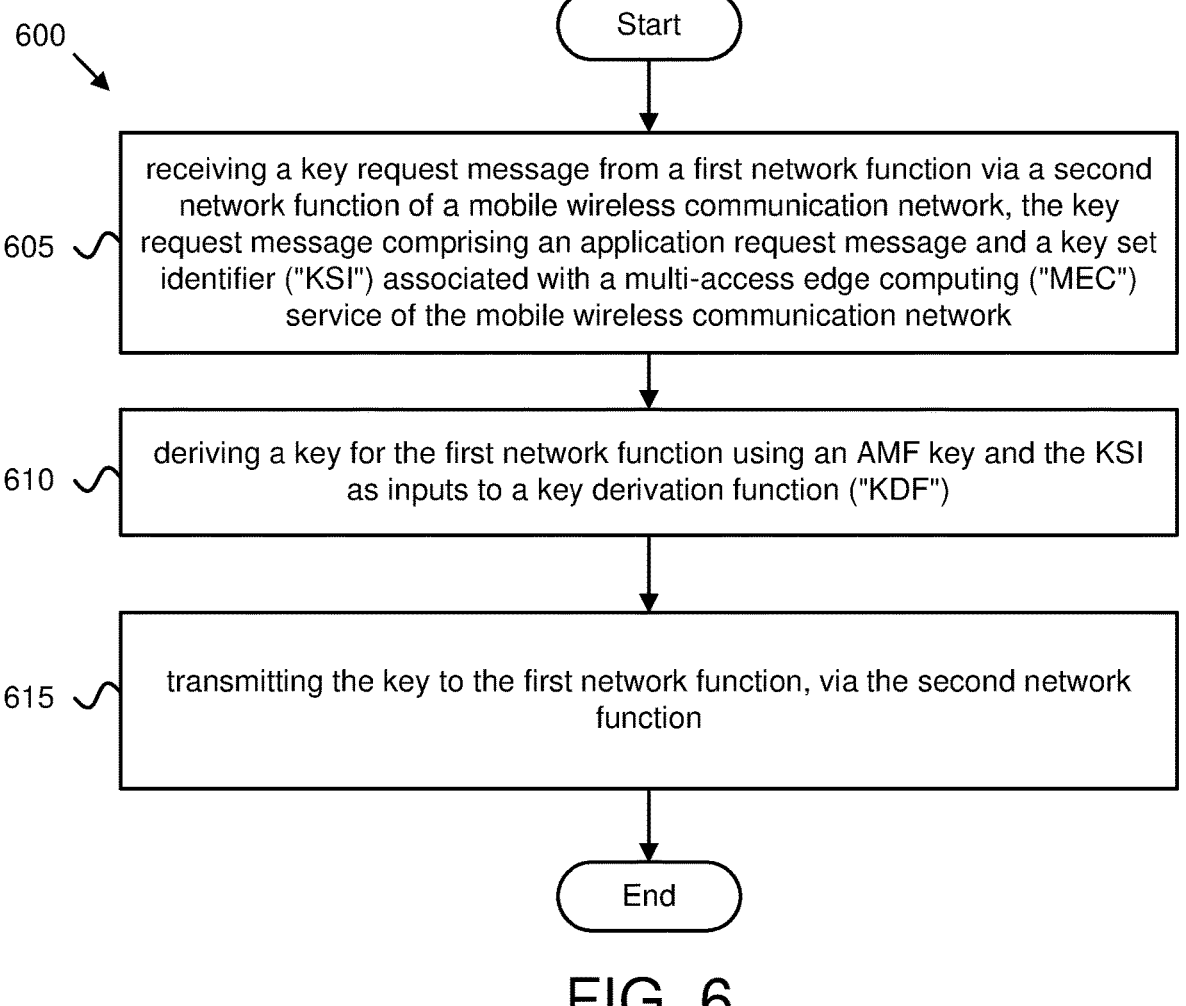

600

Start

605 — receiving a key request message from a first network function via a second network function of a mobile wireless communication network, the key request message comprising an application request message and a key set identifier ("KSI") associated with a multi-access edge computing ("MEC") service of the mobile wireless communication network 610 — deriving a key for the first network function using an AMF key and the KSI as inputs to a key derivation function ("KDF")

615 — transmitting the key to the first network function, via the second network function End

FIG. 6

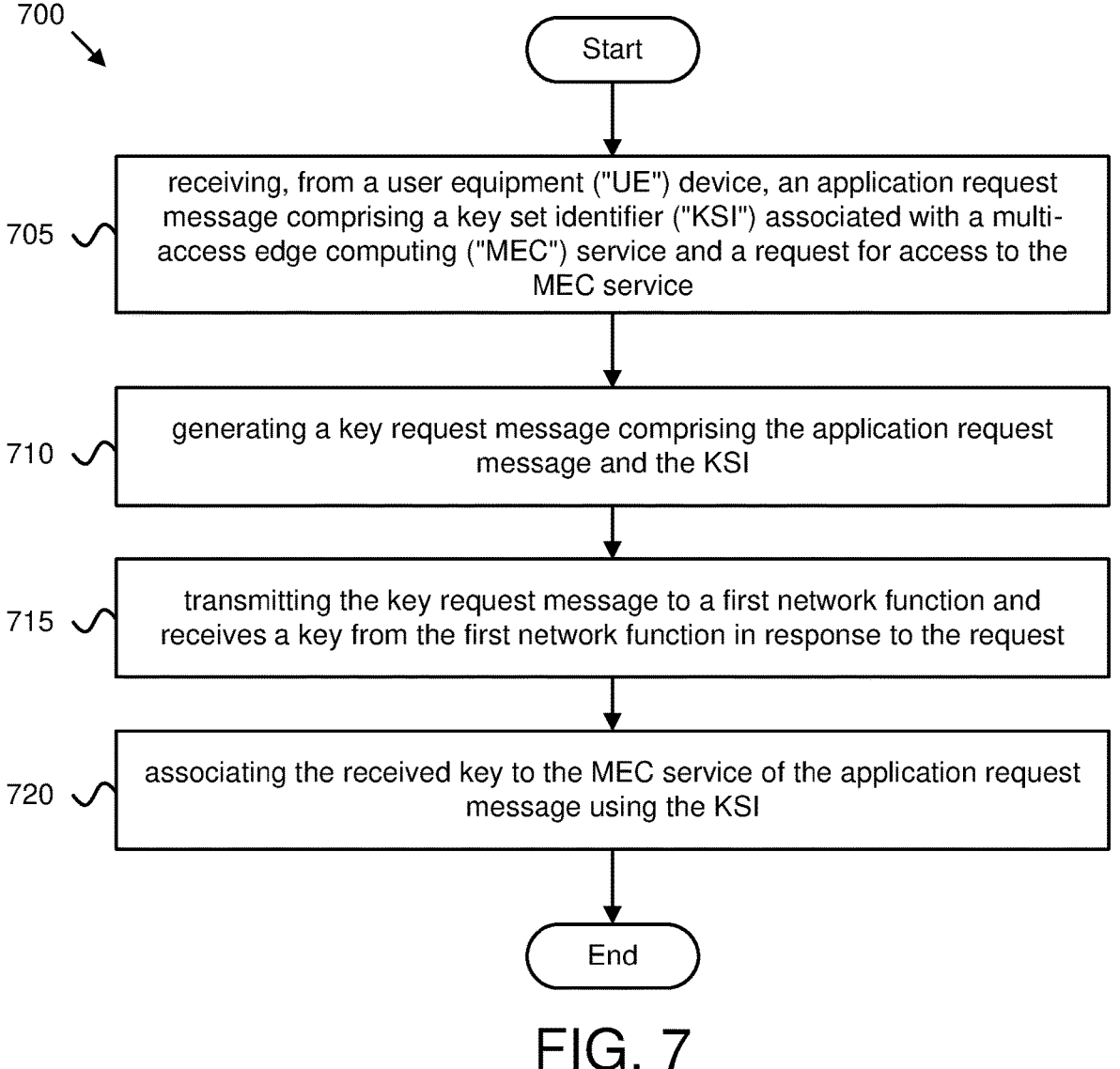

700

Start 705    receiving, from a user equipment ("UE") device, an application request message comprising a key set identifier ("KSI") associated with a multi-access edge computing ("MEC") service and a request for access to the MEC service 710    generating a key request message comprising the application request message and the KSI 715    transmitting the key request message to a first network function and receives a key from the first network function in response to the request 720    associating the received key to the MEC service of the application request message using the KSI End

FIG. 7

KEY IDENTIFICATION FOR MOBILE EDGE COMPUTING FUNCTIONS

CROSS-REFERENCES TO RELATED APPLICATIONS

This application claims the benefit of U.S. Provisional Patent Application No. 63/147,148 entitled "APPARATUSES, METHODS, AND SYSTEMS FOR KEY IDENTIFICATION FOR UES WITH SEVERAL SERVICES TO THE SAME OR DIFFERENT MEC FUNCTIONS" and filed on Feb. 8, 2021, for Andreas Kunz, et al., which is incorporated herein by reference.

FIELD

The subject matter disclosed herein relates generally to wireless communications and more particularly relates to key identification for mobile edge computing functions.

BACKGROUND

A user equipment ("UE") device may use different mobile edge computing ("MEC") services with the same UE identities for the MEC platform. For example, a UE with the same Edge Enabler Client ("EEC") identity or the same Generic Public Subscription Identifier ("GPSI") may retrieve different services from the same or different MEC entities. Thus, there is no way in which to distinguish different keys for MEC entities.

BRIEF SUMMARY

Methods for key identification for mobile edge computing functions are disclosed. Apparatuses and systems also perform the functions of the methods.

In one embodiment, a first apparatus includes a processor that generates a unique key set identifier ("KSI") associated with a multi-access edge computing ("MEC") service of a mobile wireless communication network and derives a key for a network function of the mobile wireless communication network based on a corresponding root key and the generated KSI, the KSI provided as input to a key derivation function ("KDF"). In one embodiment, the first apparatus includes a transceiver that transmits an application registration request message to the network function for establishing a secure connection to the network function using the key, the application registration request message comprising the KSI.

In one embodiment, a first method includes generating a unique key set identifier ("KSI") associated with a multi-access edge computing ("MEC") service of a mobile wireless communication network and derives a key for a network function of the mobile wireless communication network based on a corresponding root key and the generated KSI, the KSI provided as input to a key derivation function ("KDF"). In one embodiment, the first method includes transmitting an application registration request message to the network function for establishing a secure connection to the network function using the key, the application registration request message comprising the KSI.

In one embodiment, a second apparatus includes a transceiver that receives a key request message from a first network function via a second network function of a mobile wireless communication network, the key request message comprising an application request message and a key set identifier ("KSI") associated with a multi-access edge computing ("MEC") service of the mobile wireless communication network. In one embodiment, the second apparatus includes a processor that derives a key for the first network function using an AMF key and the KSI as inputs to a key derivation function ("KDF"). In one embodiment, the transceiver transmits the key to the first network function, via the second network function.

In one embodiment, a second method includes receiving a key request message from a first network function via a second network function of a mobile wireless communication network, the key request message comprising an application request message and a key set identifier ("KSI") associated with a multi-access edge computing ("MEC") service of the mobile wireless communication network. In one embodiment, the second method includes deriving a key for the first network function using an AMF key and the KSI as inputs to a key derivation function ("KDF"). In one embodiment, the second method includes transmitting the key to the first network function, via the second network function.

In one embodiment, a third apparatus includes a transceiver that receives, from a user equipment ("UE") device, an application request message comprising a key set identifier ("KSI") associated with a multi-access edge computing ("MEC") service and a request for access to the MEC service. In one embodiment, the third apparatus includes a processor that generates a key request message comprising the application request message and the KSI. In one embodiment, the transceiver transmits the key request message to a first network function and receives a key from the first network function in response to the request. In one embodiment, the processor associates the received key to the MEC service of the application request message using the KSI.

In one embodiment, a third method includes receiving, from a user equipment ("UE") device, an application request message comprising a key set identifier ("KSI") associated with a multi-access edge computing ("MEC") service and a request for access to the MEC service. In one embodiment, the third method includes generating a key request message comprising the application request message and the KSI. In one embodiment, the third method includes transmitting the key request message to a first network function and receives a key from the first network function in response to the request. In one embodiment, the third method includes associating the received key to the MEC service of the application request message using the KSI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail through the use of the accompanying drawings, in which:

FIG. 6 is a flowchart diagram illustrating one embodiment of another method that may be used for key identification for mobile edge computing functions; and FIG. 7 is a flowchart diagram illustrating one embodiment of yet another method that may be used for key identification for mobile edge computing functions.

DETAILED DESCRIPTION

Figure 1:
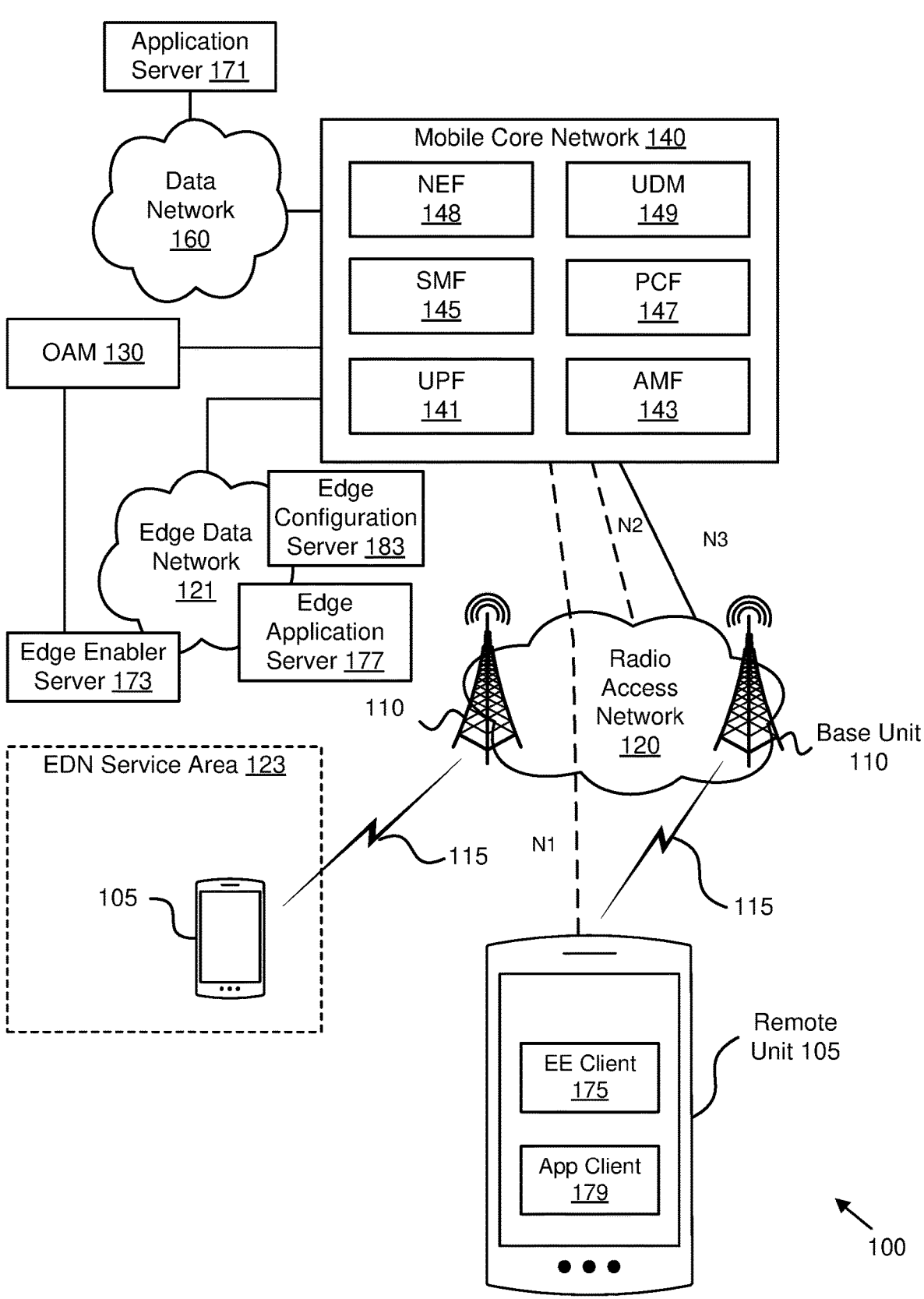
FIG. 1 is a schematic block diagram illustrating one embodiment of a wireless communication system for key identification for mobile edge computing functions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an objectoriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for key identification for mobile edge computing functions. A UE device may use different MEC services with the same UE identities for the MEC platform. For example, a UE with the same EEC identity or the same GPSI may retrieve different services from the same or different MEC entities. Thus, there is no way in which to distinguish different keys for MEC entities (since currently only one key is derived per MEC function respectively for all services per MEC function).

Solutions have been proposed (e.g., see 3GPP S3-210430) that suggest that the EEC identifier can be used as a key identifier to distinguish the edge configuration server ("ECS") key $K_{ECS}$ for different ECS's and respectively the edge enabler server ("EES") key $K_{EES}$ and the edge application server ("EAS") key $K_{EAS}$ as well. The main issue with this solution is that the same ECS identifier may be used for different services at the same or different ECS's so that the keys would be the same, leading to a security issue for those services. The lack of uniqueness of the identities within the MEC platform make the keys not suitable as input for the key derivation function ("KDF") for a unique key per service.

As described in more detail below, in the proposed solutions, the UE generates a unique Key Set Identifier ("KSI") at the time it wants to request a new MEC service. The KSI is transmitted to the MEC functions and as well to the AMF, which can derive the first key only with the KSI from the UE and to verify the MAC-I of the message to authenticate the UE towards the MEC function (e.g., the ECS).

FIG. 1 depicts a wireless communication system 100 that supports key identification for mobile edge computing functions including at least one edge data network ("EDN") 121 supporting an EDN service area 123. The EDN 121 includes at least one Edge Application Server ("EAS") 177 supporting an instance of an application. When a remote unit 105 is in the EDN service area 123, the application client 179 on the remote unit 105 can access the EAS 177. However, when the remote unit 105 is outside any EDN service area 123, the application client 179 can access an instance of the application using the application server 171 located in the data network 160 (e.g., a regional data network). The EDN 121 also includes an edge enabler server ("EES") 173, an edge configuration server ("ECS") 183, a middleware application enabler server, while the remote unit 105 includes an edge enabler client ("EEC") 175.

In one embodiment, the remote units 105 may include UE's such as computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with a communication host (e.g., edge application server 173 and/or application server 171) via a network connection with the mobile core network 140. For example, an application client 179 in a remote unit 105 may trigger the remote unit 105 to establish a protocol data unit ("PDU") session (or other data connection) with the mobile core network 140 via the RAN 120. The mobile core network 140 then relays traffic between the remote unit 105 and the communication host (i.e., application server) using the PDU session. Note that the remote unit 105 may establish one or more PDU sessions (or other data connections) with the mobile core network 140. As such, the remote unit 105 may concurrently have at least one PDU session for communicating with one application server and at least one additional PDU session for communicating with another application server (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve several remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, a Network Exposure Function ("NEF") 148, and a Service Capability Exposure Function ("SCEF") 149. The NEF 148 and SCEF 149 provide means to securely expose the services and capabilities provided by 3GPP network interfaces.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network slice instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

The Operations, Administration and Maintenance ("OAM") 130 is involved with the operating, administering, managing and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 130 may also be involved with provisioning, i.e., the setting up of the user accounts, devices, and services. The OAM/Management function 130 may provide slice parameters (e.g., GSTs) to the enabler servers (e.g., EES 173). In various embodiments, the OAM/Management function 130 performs slice instantiation, e.g., in response to a request from a service provider.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described solutions apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting middleware-assisted slice and/or DNN re-mapping for vertical applications and/or edge network deployments.

The solution proposed below is based on the AMF key Kang that is generated during primary authentication. The network function that receives a registration request queries the previous network function for authentication and the key for setting up an internet protocol security ("IPsec") security association ("SA"). Messages are protected with a message authentication code for integrity ("MAC-I"), which is also used to authenticate the UE.

In one embodiment, when the ECS is located in the serving network or hosted by a third-party service provider, the services are to be hosted close to the UE's access point of attachment to achieve an efficient service delivery through the reduced end-to-end latency and load on the transport network. In case of special roaming scenarios where the ECS is located in the home PLMN ("HPLMN") while the UE is in a visiting PLMN ("VPLMN"), the ECS key $K_{ECS}$ is derived from the VPLMN AMF key $K_{AMF}$.

Figure 2:
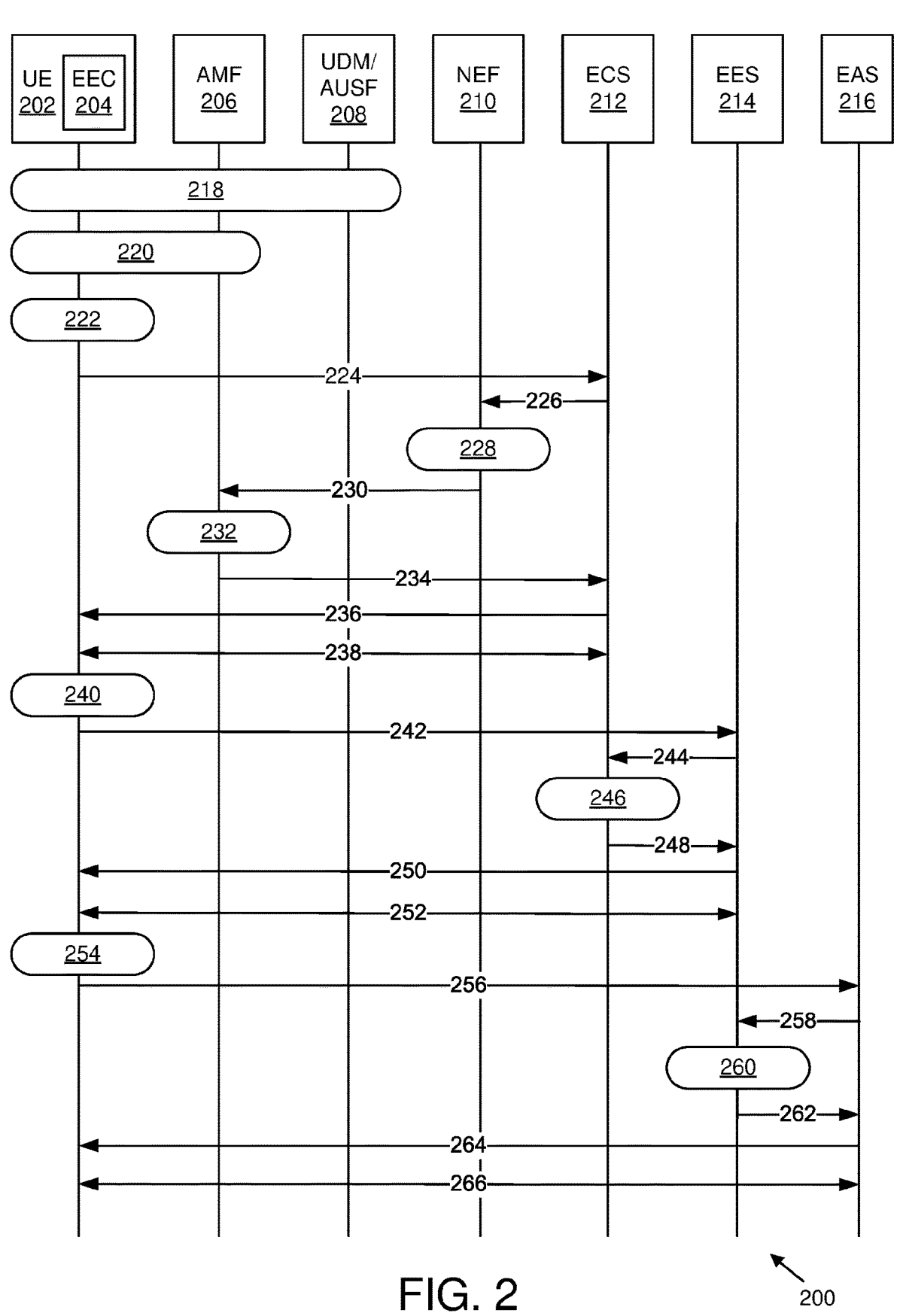
FIG. 2 is a diagram illustrating signaling flow for one embodiment of a procedure for key identification for mobile edge computing functions.

FIG. 2 is a diagram illustrating signaling flow for one embodiment of a procedure 200 for key identification for mobile edge computing functions. In one embodiment, the procedure 200 includes a UE 202, an EEC 204, an AMF 206, a UDM/AUSF 208, a NEF 210, an ECS 212, an EES 214, and an EAS 216.

At step 1 (see block 218), in one embodiment, the UE 202 performs primary authentication and registration to the network. The UE 202 is MEC-capable and may indicate this in the MEC capabilities to the AMF 206 during the registration procedure. The AMF 206 may provide the GPSI from the subscription profile to the UE 202.

At step 2 (see block 220), in one embodiment, the UE 202 establishes a PDU Session for IP connectivity.

At step 3 (see block 222), in one embodiment, if the UE 202 is MEC-capable and intends to use the MEC service, then the UE 202 generates a unique key set identifier ("KSI") for the MEC service and derives an ECS key $K_{ECS}$ for authentication with the ECS 212 from the AMF key $K_{AMF}$, using the KSI as input to the KDF. The uniqueness of the KSI may only be required within the UE 202 to distinguish the different services with their keys. If the UE 202 wants to use different MEC services at the same or different ECS 212, EES 214. and EAS 216, then the KSI is used to identify the particular key for a particular service and to ensure the keys are different per service, depending on the KSI allocation scheme in the UE 202. The KSI may have different formats, values, structures, and/or the like, such as:

a counter up to a maximum number of simultaneous services;
  a random number that is long enough to ensure unique KSI's within the UE 202;
  a static KSI value that is preconfigured per MEC service; and/or
  a string as a KSI that describes the MEC service associated with the KSI, e.g., a service ID.

The KSI, in one embodiment, can be the same for one service and for all MEC functions, e.g., ECS 212, EES 214, and EAS 216, or it can be allocated individually or additionally per service and per function in the ECS 212, EES 214, and EAS 216. In one embodiment, if the UE 202 reuses one network function for different services, then it may reuse the previously established security association, e.g., if the UE 202 has several services to the same ECS 212, then it may require only one KSI and one shared security association to the ECS 212, but if those services then terminate at a different service such as an EES 214 or EAS 216, then the UE 202 would have to generate different KSIs at least on a per network function (EES 214 or EAS 216 in this example) basis.

In one embodiment, the KSI may be valid for the lifetime of the MEC service duration, until the AMF key is refreshed, and/or the AMF 206 is changed. In some embodiments, the KSI is permanently assigned per service and stored in the UE 202. In one embodiment, the UE 202 and AMF 206 initialize the ECS Counter $Counter_{ECS}$ when the ECS key $K_{ECS}$ is derived, and the counter is stored for the lifetime of the ECS key $K_{ECS}$.

At step 4 (see messaging 224), in one embodiment, the UE 202 sends an Application Registration Request with a KSI, an ECS MAC-I $MAC-I_{ECS}$, a globally unique AMF identifier ("GUAMI"), and a GPSI to the ECS 212. The $MAC-I_{ECS}$ is computed in a similar way as e.g., the steering of roaming ("SoR") $SoR-MAC-I_{AUSF}$, e.g., as defined in Annex A.17 of TS 33.501. In one embodiment, the $MAC-I_{ECS}$ is based on the payload of the Application Registration Request, which forms the input Application Registration Request Data, a counter of the ECS messages $Counter_{ECS}$, and the ECS key $K_{ECS}$ to the KDF. In one embodiment, the $MAC-I_{ECS}$ is identified with the 128 least significant bits of the output of the KDF. The UE 202, in one embodiment, monotonically increments $Counter_{ECS}$ for each additionally calculated $MAC-I_{ECS}$. In one embodiment, the GUAMI is provided by the UE (from the allocated GUTI) to the EEC 204 along with the ECS key $K_{ECS}$. In one embodiment, the GUAMI has a form of <GUAMI>=<MCC><MNC><AMF Region ID><AMF Set ID><AMF Pointer>, which may be based on TS 23.003.

In one embodiment, with this information it is possible to find the same AMF 206 with the NEF 210 as selected by the gNB/non-3GPP interworking function ("N3IWF"), because, in a similar case of IDLE mode mobility, when the UE 202 switches into CONNECTED mode, the new gNB needs to select the same AMF 206 as well. In one embodiment, there is no privacy issue on the GUAMI since it is a pure network entity identifier and not identifying any UE 202. The GUAMI may be already transmitted over the air interface as part of the 5G-GUTI. In one embodiment, this solution requires that the GPSI, which currently is an optional input parameter, is sent in the EEC registration request.

At step 5 (see messaging 226), in one embodiment, the UE 202 is not authenticated at the ECS 212 and the ECS 212 sends a Key Request including the Application Registration Request to the NEF 210, which is selected based on the GPSI. The NEF 210 selection, in one embodiment, is specified in TS 23.502 and the ECS 212 may determine the IP address(es)/port(s) of the NEF 210 by performing a domain name system ("DNS") query using the GPSI, or by using a locally configured NEF identifier/address.

At step 6 (see block 228), in one embodiment, the NEF 210 authorizes the request from the ECS 212 and identifies the AMF 206 based on the GUAMI. The NEF 210, in one embodiment, stores the contact of the ECS 212 (e.g., the IP address, the source network access identifier ("NAI") of the ECS 212, or the like) with the GPSI to route the answer from the AMF 206 back to the ECS 212.

At step 7 (see messaging 230), in one embodiment, the NEF 210 forwards the Key Request, including the Application Registration Request, to the AMF 206.

At step 8 (see block 232), in one embodiment, the AMF 206 derives the ECS key $K_{ECS}$ from the AMF key $K_{AMF}$, using the KSI as input to the KDF and verifies the $MAC-I_{ECS}$ of the Application Registration Request, e.g., the AMF 206 computes the MAC-I with the ECS key $K_{ECS}$ over the Application Registration Request payload (e.g., in a similar way as the UE 206) and compares the result with the $MAC-I_{ECS}$ included in message. If both are identical, in one embodiment, the message can be authenticated to be sent by the UE 202, and the AMF 206 monotonically increments the ECS counter Counter$_{ECS}$.

At step 9 (see messaging 234), in one embodiment, the AMF 206 sends a Key Response to the ECS 212, including the result of the authentication as well as the ECS key K$_{ECS}$.

At step 10 (see messaging 236), in one embodiment, based on the authentication result, the ECS 212 decides whether to accept or to reject the Application Registration Request from the UE 202. The ECS 212 sends the Application Registration Response message to the UE 202 including the authentication result and protects the message with a MAC-I$_{ECS}$ based on the received ECS key K$_{ECS}$ in a similar way as the UE 202 protected the payload of the message in step 4. The ECS 212, in one embodiment, may associate the ECS key K$_{ECS}$ to the requested service based on the KSI, especially if different KSIs for different services at the same ECS 212 are used.

At step 11 (see messaging 238), in one embodiment, the UE 202 verifies the MAC-I$_{ECS}$ and, if the authentication result and the verification of the message are successful, then the UE 202 establishes an IPsec SA between the UE 202 and ECS 212 by using the ECS key KEGS All messages may now be confidentiality and integrity protected by the IPsec tunnel.

At step 12 (see block 240), in one embodiment, the UE 202 derives the EES key K$_{EES}$ from the ECS key K$_{ECS}$ using a MEC Key Distinguisher flag and/or the KSI as input to the KDF. The UE 202 may generate a dedicated KSI for the EES 214 for the requested service, or may reuse the KSI generated for the ECS 212, or, if the UE 202 detects that the UE 202 already has a security association (e.g., KSI, IPSec tunnel with EES key K$_{EES}$) to the same EES 214 for another service, then it may reuse the same previously established security association.

At step 13 (see messaging 242), in one embodiment, the UE 202 sends an Application Registration Request with the KSI and a MAC-I$_{EES}$ to the EES 214. If by configuration, for example, the same ECS 212 and EES 214 are used for all services, the KSI may not need to be sent. The MAC-I$_{EES}$, in one embodiment, is computed (based on the payload of the Application Registration Request, which forms the input Application Registration Request Data) and provided, together with the EES key K$_{EES}$, to the KDF. The MAC-I$_{EES}$, in one embodiment, is identified with the 128 least significant bits of the output of the KDF.

At step 14 (see messaging 244), in one embodiment, the UE 202 is not authenticated at the EES 214, and the EES 214 sends a Key Request with the KSI (if available) to the ECS 212. In one embodiment, the selection of the ECS 214 may be based on the UE ID.

At step 15 (see block 246), in one embodiment, the ECS 212 identifies the UE 202 based on the UE ID and derives the EES key K$_{EES}$ in a similar way as the UE 202 in step 10. The KSI, in one embodiment, is used to identify the particular key and to ensure the keys are different per service at the same or different EES 214, depending on the KSI allocation scheme in the UE 202, e.g., the same key could be used for all services at the same EES 214. The ECS 212, in one embodiment, verifies the MAC-I$_{EES}$ of the Application Registration Request, e.g., the ECS 212 computes the MAC-I with the EES key K$_{EES}$ over the Application Registration Request payload in a similar way as the UE 202 and compares the result with the MAC-I$_{EES}$ included in the message. If both are identical, the message may be authenticated to be sent by the UE 202.

At step 16 (see messaging 248), in one embodiment, the ECS 212 sends a Key Request Response to the EES 214, including the result of the authentication as well as the EES key K$_{EES}$. If by configuration, for example, the same ECS 212 and EES 214 are used for all services, the stored KSI received in step 4 is also provided to the EES 214.

At step 17 (see messaging 250), in one embodiment, based on the authentication result, the EES 214 decides whether to accept or to reject the Application Registration Request from the UE 202. The EES 214, in one embodiment, sends the Application Registration Response message to the UE 202 including the authentication result and protects the message with a MAC-I$_{EES}$ based on the received EES key K$_{EES}$ in a similar way as the UE 202 protected the payload of the message in step 15. The EES 214 may associate the EES key K$_{EES}$ to the requested service based on the KSI, especially if different KSIs for different services at the same EES 214 are used.

At step 18 (see messaging 252), in one embodiment, the UE 202 verifies the MAC-I$_{EES}$ and, if the authentication result and verification of the message are successful, then the UE 202 establishes an IPsec SA between the UE 202 and the EES 214 by using the EES key K$_{EES}$. All messages may now be confidentiality and integrity protected by the IPsec tunnel.

At step 19 (see block 254), in one embodiment, the UE 202 derives the EAS key K$_{EAS}$ from the EES key K$_{EES}$ using a MEC Key Distinguisher flag and/or the KSI as input to the KDF. The UE 202 may generate a dedicated KSI for the EAS 216 for the requested service, or may reuse the KSI generated for the ECS 212 or EES 214, or, if the UE 202 detects that the UE 202 already has a security association (e.g., KSI, IPSec tunnel with EAS key K$_{EAS}$) to the same EAS 216 for another service, then it may reuse the same previously established security association.

At step 20 (see messaging 256), in one embodiment, the UE 202 sends an Application Registration Request with the KSI and a MAC-I$_{EAS}$ to the EAS 216. If by configuration, for example, the same EES 214 and EAS 216 are used for all services, the KSI may not need to be sent. The MAC-I$_{EAS}$, in one embodiment, is computed (based on the payload of the Application Registration Request, which forms the input Application Registration Request Data), and provided, together with the EAS key K$_{EAS}$, to the KDF. The MAC-I$_{EAS}$, in one embodiment, is identified with the 128 least significant bits of the output of the KDF.

At step 21 (see messaging 258), in one embodiment, the UE 202 is not authenticated at the EAS 216 and the EAS 216 sends a Key Request with the KSI (if available) to the EES 214. The selection of the EES 214 may be based on the UE ID.

At step 22 (see block 260), in one embodiment, the EES 214 identifies the UE 202 based on the UE ID and derives the EAS key K$_{EAS}$ in a similar way as the UE 202 in step 17. The KSI may be used to identify the particular key and to ensure the keys are different per service at the same or different EAS 216, depending on the KSI allocation scheme in the UE 202, e.g., the same key may be used for all services at the same EAS 216. The EES 214, in one embodiment, verifies the MAC-I$_{EAS}$ of the Application Registration Request, e.g., it computes the MAC-I with the EAS key K$_{EAS}$ over the Application Registration Request payload in a similar way as the UE 202 and compares the result with the MAC-TEAS included in message. If both are identical, the message may be authenticated to be sent by the UE 202.

At step 23 (see messaging 262), in one embodiment, the EES 214 sends a Key Request Response to the EAS 216, including the result of the authentication as well as the EAS key $K_{EAS}$.

At step 24 (see messaging 264), in one embodiment, based on the authentication result, the EAS 216 decides whether to accept or to reject the Application Registration Request from the UE 202. The EAS 216, in one embodiment, sends the Application Registration Response message to the UE 202, including the authentication result, and protects the message with a MAC-TEAS based on the received EAS key $K_{EAS}$ in a similar way as the UE 202 protected the payload of the message in step 22. The EAS 216 may associate the EAS key $K_{EAS}$ to the requested service based on the KSI, especially if different KSIs for different services at the same EAS 216 are used.

At step 25 (see messaging 266), in one embodiment, the UE 202 verifies the MAC-TEAS and, if the authentication result and verification of the message are successful, then the UE 202 establishes an IPsec SA between the UE 202 and the EAS 216 by using the EAS key $K_{EAS}$. All messages may now be confidentiality and integrity protected by the IPsec tunnel.

Figure 3:
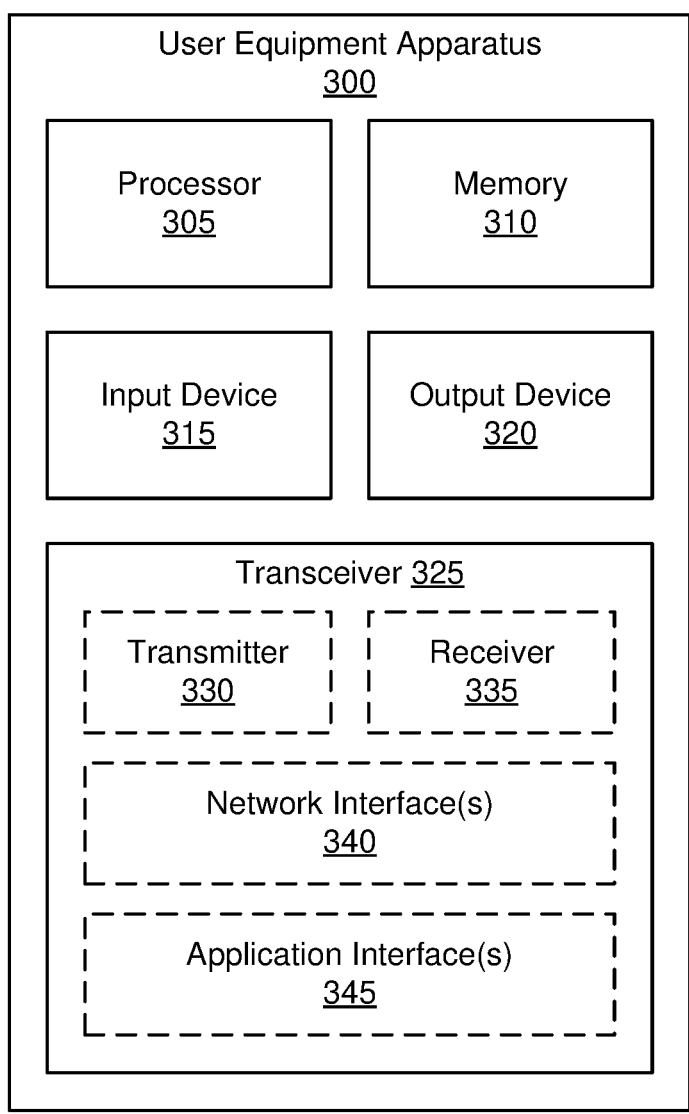
FIG. 3 is a diagram illustrating one embodiment of a user equipment apparatus that may be used for key identification for mobile edge computing functions.

FIG. 3 is a diagram illustrating one embodiment of a user equipment apparatus that may be used for key identification for mobile edge computing functions, according to embodiments of the disclosure. In various embodiments, the user apparatus 300 is used to implement one or more of the solutions described above. The user apparatus 300 may include a processor 305, a memory 310, an input device 315, an output device 320, and a transceiver 325. In some embodiments, the input device 315 and the output device 320 are combined into a single device, such as a touchscreen. In certain embodiments, the user apparatus 300 may not include any input device 315 and/or output device 320. In various embodiments, the user apparatus 300 may include one or more of: the processor 305, the memory 310, and the transceiver 325, and may not include the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a FPGA, or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325. In various embodiments, the processor 305 controls the user apparatus 300 to implement the above-described UE and/or UE client behaviors.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to authentication key derivation. For example, the memory

310 may store keys, identifiers, and/or other information related to key derivation. In certain embodiments, the memory 310 also stores program code and related data, such as an operating system or other controller algorithms operating on the UE.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

As discussed above, the transceiver 325 communicates with one or more network equipment devices, described below. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages.

In various embodiments, the transceiver 325 is configured to communication with 3GPP access network(s) and/or the non-3GPP access network(s). In some embodiments, the transceiver 325 implements modem functionality for the 3GPP access network(s) and/or the non-3GPP access network(s). In one embodiment, the transceiver 325 implements multiple logical transceivers using different communication protocols or protocol stacks, while using common physical hardware.

In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

The transceiver 325 may include one or more transmitters 330 and one or more receivers 335. Although a specific number of transmitters 330 and receivers 335 are illustrated, the user equipment apparatus 300 may have any suitable number of transmitters 330 and receivers 335. Further, the transmitter(s) 330 and the receiver(s) 335 may be any suitable type of transmitters and receivers. In certain embodiments, the one or more transmitters 330 and/or the one or more receivers 335 may share transceiver hardware and/or circuitry. For example, the one or more transmitters 330 and/or the one or more receivers 335 may share antenna(s), antenna tuner(s), amplifier(s), filter(s), oscillator(s), mixer(s), modulator/demodulator(s), power supply, and the like.

In various embodiments, the transceiver 325 is capable of communicating with a mobile core network via an access network. Accordingly, the transceiver 325 may support at least one network interface 340. Here, the at least one network interface 340 facilitates communication with a RAN node, such as an eNB or gNB, for example using the "Uu" interface (e.g., LTE-Uu for eNB, NR-Uu for gNB). Additionally, the at least one network interface 340 may include an interface used for communications with one or more network functions in the mobile core network, such as a UPF 141, an AMF 143, a SMF 145, and/or a PCF 147. In certain embodiments, the transceiver 325 may support a PC5 interface for sidelink communication. The transceiver 325 and/or processor 305 may support one or more application interfaces 345.

In various embodiments, one or more transmitters 330 and/or one or more receivers 335 may be implemented and/or integrated into a single hardware component, such as a multi-transceiver chip, a system-on-a-chip, an application-specific integrated circuit ("ASIC"), or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module. In certain embodiments, the transceiver 325 may implement a 3GPP modem (e.g., for communicating via NR or LTE access networks) and a non-3GPP modem (e.g., for communicating via Wi-Fi or other non-3GPP access networks).

In one embodiment, the processor 305 and the transceiver 325 function to perform the various steps of the proposed solution. In one embodiment, the processor 305 generates a unique key set identifier ("KSI") associated with a multi-access edge computing ("MEC") service of a mobile wireless communication network and derives a key for a network function of the mobile wireless communication network based on a corresponding root key and the generated KSI, the KSI provided as input to a key derivation function ("KDF"). In one embodiment, the transceiver 325 transmits an application registration request message to the network function for establishing a secure connection to the network function using the key, the application registration request message comprising the KSI.

In one embodiment, the network function is selected from the group comprising an edge configuration server ("ECS"), an edge enabler server ("EES"), and an edge application server ("EAS").

In one embodiment, the KSI that is generated for the associated MEC service is used to derive keys for each of the ECS, the EES, and the EAS network functions using the KDF.

In one embodiment, the processor 305 generates the unique KSI for the associated MEC service and different unique KSIs to derive keys for each of the ECS, the EES, and the EAS network functions using the KDF.

In one embodiment, the corresponding root key is a key for one of an access and mobility management function ("AMF"), the ECS, and the EES.

In one embodiment, the KSI is valid for one or more of a duration of the MEC service that the KSI is associated with, until an access and mobility management function ("AMF") key is refreshed, and until the AMF is changed.

In one embodiment, the KSI is permanently assigned to the associated MEC service.

In one embodiment, the KSI is a value of a counter that is increased with each new KSI that is generated up to a maximum number of MEC services that can be simultaneously used.

In one embodiment, the KSI is a randomly generated number having a length that ensures a uniqueness of the random number relative to the number of available MEC services.

In one embodiment, the KSI is a static value that is pre-configured for the associated MEC service.

In one embodiment, the KSI is a character string derived from one of a name and a description of the associated MEC service.

Figure 4:
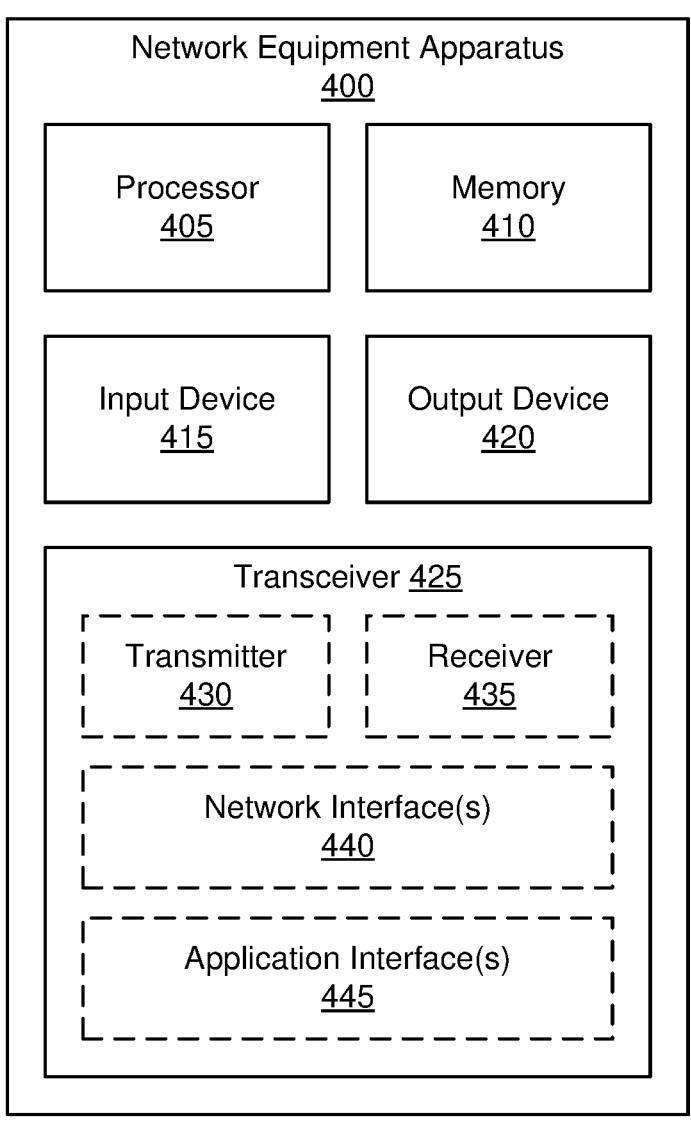
FIG. 4 is a diagram illustrating one embodiment of a network equipment apparatus that may be used for key identification for mobile edge computing functions.

FIG. 4 is a diagram illustrating one embodiment of a network equipment apparatus that may be used for key identification for mobile edge computing functions, according to embodiments of the disclosure. Network equipment apparatus 400 may include a processor 405, a memory 410, an input device 415, an output device 420, a transceiver 425, and application interface 445. In some embodiments, the input device 415 and the output device 420 are combined into a single device, such as a touch screen. In certain embodiments, the network equipment apparatus 400 does not include any input device 415 and/or output device 420.

As depicted, the transceiver 425 includes at least one transmitter 430 and at least one receiver 435. Here, the transceiver 425 communicates with one or more remote units 105. Additionally, the transceiver 425 may support at least one network interface 440 and/or application interface 445. In some embodiments, the transceiver 425 supports an interface (e.g., a Nnef interface) for communicating with a NEF (i.e., the NEF 148). Other network interfaces may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the first transceiver 425. In various embodiments, the processor 405 controls the network equipment apparatus 400 to implement the above-described key identification for mobile edge computing functions behaviors.

In one embodiment, the processor 405 and the transceiver 425 function to perform the various steps of the proposed solution. In one embodiment, the transceiver 425 receives a key request message from a first network function via a second network function of a mobile wireless communication network, the key request message comprising an application request message and a key set identifier ("KSI") associated with a multi-access edge computing ("MEC") service of the mobile wireless communication network. In one embodiment, the processor 405 derives a key for the first network function using an AMF key and the KSI as inputs to a key derivation function ("KDF"). In one embodiment, the transceiver 425 transmits the key to the first network function, via the second network function.

In one embodiment, the transceiver 425 receives, from a user equipment ("UE") device, an application request message comprising a key set identifier ("KSI") associated with a multi-access edge computing ("MEC") service and a request for access to the MEC service. In one embodiment, the processor 405 generates a key request message comprising the application request message and the KSI. In one embodiment, the transceiver 425 transmits the key request message to a first network function and receives a key from the first network function in response to the request. In one embodiment, the processor 405 associates the received key to the MEC service of the application request message using the KSI.

In one embodiment, the network function apparatus comprises one of an edge configuration server ("ECS"), an edge enabler server ("EES"), and an edge application server ("EAS"), and the first network function comprises a corresponding one of a network exposure function ("NEF"), an ECS, and an EES.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to selecting a server application instance, for example storing server addresses, UE locations, DNS cache, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, all, or portions of the output device 420 may be located near the input device 415.

As discussed above, the transceiver 425 may communicate with one or more remote units and/or with one or more interworking functions that provide access to one or more PLMNs. The transceiver 425 may also communicate with one or more network functions (e.g., in the mobile core network 120). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

Figure 5:
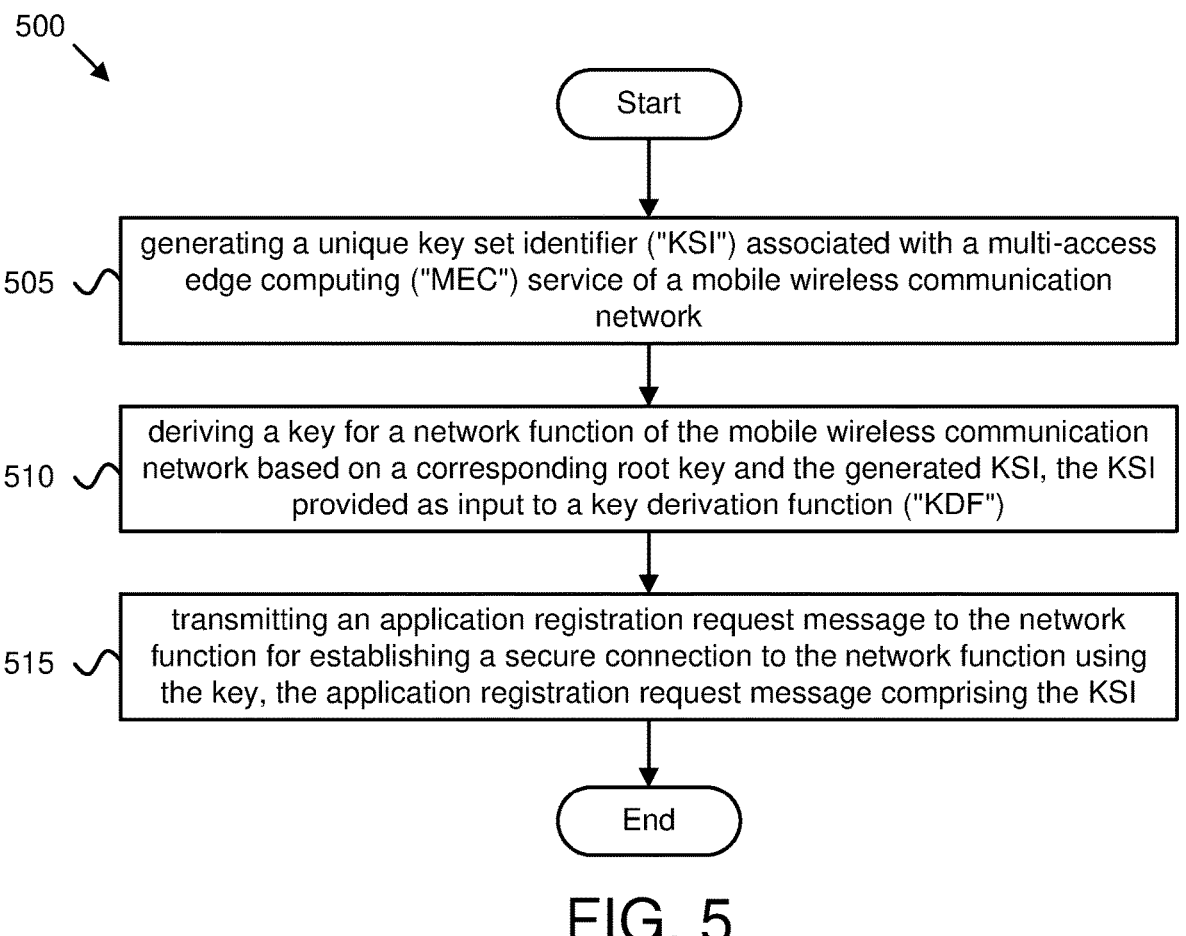
FIG. 5 is a flowchart diagram illustrating one embodiment of a method that may be used for key identification for mobile edge computing functions.

FIG. 5 depicts one embodiment of a method 500 for key identification for mobile edge computing functions, according to embodiments of the disclosure. In various embodiments, the method 500 is performed by a user equipment apparatus 300, described above. In some embodiments, the method 500 is performed by a processor, such as a microcontroller, a microprocessor, a CPU, a GPU, an auxiliary processing unit, a FPGA, or the like.

In one embodiment, the method 500 begins and generates 505 a unique key set identifier ("KSI") associated with a multi-access edge computing ("MEC") service of a mobile wireless communication network. The method 500, in one embodiment, derives 510 a key for a network function of the mobile wireless communication network based on a corresponding root key and the generated KSI, the KSI provided as input to a key derivation function ("KDF"). In one embodiment, the method 500 transmits 515 an application registration request message to the network function for establishing a secure connection to the network function using the key, the application registration request message comprising the KSI, and the method 500 ends.

FIG. 6 depicts one embodiment of a method 600 for key identification for mobile edge computing functions, according to embodiments of the disclosure. In various embodiments, the method 600 is performed by a network function, e.g., an AMF, executing on a network equipment apparatus 400, described above. In some embodiments, the method 600 is performed by a processor, such as a microcontroller, a microprocessor, a CPU, a GPU, an auxiliary processing unit, a FPGA, or the like.

In one embodiment, the method 600 begins and receives 605 a key request message from a first network function via a second network function of a mobile wireless communication network, the key request message comprising an application request message and a key set identifier ("KSI") associated with a multi-access edge computing ("MEC") service of the mobile wireless communication network. In one embodiment, the method 600 derives 610 a key for the first network function using an AMF key and the KSI as inputs to a key derivation function ("KDF"). In one embodiment, the method 600 transmits 615 the key to the first network function, via the second network function, and the method 600 ends.

FIG. 7 depicts one embodiment of a method 700 for key identification for mobile edge computing functions, according to embodiments of the disclosure. In various embodiments, the method 700 is performed by a network function, e.g., an ECS, an EES, or an EAS, executing on a network equipment apparatus 400, described above, which may be part of a mobile edge computing network. In some embodiments, the method 700 is performed by a processor, such as a microcontroller, a microprocessor, a CPU, a GPU, an auxiliary processing unit, a FPGA, or the like.

In one embodiment, the method 700 begins and receives 705, from a user equipment ("UE") device, an application request message comprising a key set identifier ("KSI") associated with a multi-access edge computing ("MEC") service and a request for access to the MEC service. The method 700, in one embodiment, generates 710 a key request message comprising the application request message and the KSI. The method 700, in one embodiment, transmits 715 the key request message to a first network function and receives a key from the first network function in response to the request. In one embodiment, the method 700 associates 720 the received key to the MEC service of the application request message using the KSI, and the method 700 ends.

Disclosed herein is a first apparatus for key identification for mobile edge computing functions, according to embodiments of the disclosure. In various embodiments, the first apparatus includes a user equipment apparatus 300, described above. In some embodiments, the first apparatus includes a processor, such as a microcontroller, a microprocessor, a CPU, a GPU, an auxiliary processing unit, a FPGA, or the like.

In one embodiment, the first apparatus includes a processor that generates a unique key set identifier ("KSI") associated with a multi-access edge computing ("MEC") service of a mobile wireless communication network and derives a key for a network function of the mobile wireless communication network based on a corresponding root key and the generated KSI, the KSI provided as input to a key derivation function ("KDF"). In one embodiment, the first apparatus includes a transceiver that transmits an application registration request message to the network function for establishing a secure connection to the network function using the key, the application registration request message comprising the KSI.

In one embodiment, the network function is selected from the group comprising an edge configuration server ("ECS"), an edge enabler server ("EES"), and an edge application server ("EAS").

In one embodiment, the KSI that is generated for the associated MEC service is used to derive keys for each of the ECS, the EES, and the EAS network functions using the KDF.

In one embodiment, the processor generates the unique KSI for the associated MEC service and different unique KSIs to derive keys for each of the ECS, the EES, and the EAS network functions using the KDF.

In one embodiment, the corresponding root key is a key for one of an access and mobility management function ("AMF"), the ECS, and the EES.

In one embodiment, the KSI is valid for one or more of a duration of the MEC service that the KSI is associated with, until an access and mobility management function ("AMF") key is refreshed, and until the AMF is changed.

In one embodiment, the KSI is permanently assigned to the associated MEC service.

In one embodiment, the KSI is a value of a counter that is increased with each new KSI that is generated up to a maximum number of MEC services that can be simultaneously used.

In one embodiment, the KSI is a randomly generated number having a length that ensures a uniqueness of the random number relative to the number of available MEC services.

In one embodiment, the KSI is a static value that is pre-configured for the associated MEC service.

In one embodiment, the KSI is a character string derived from one of a name and a description of the associated MEC service.

Disclosed herein is a first method for key identification for mobile edge computing functions, according to embodiments of the disclosure. In various embodiments, the first method is performed by a user equipment apparatus 300, described above. In some embodiments, the first method is performed by a processor, such as a microcontroller, a microprocessor, a CPU, a GPU, an auxiliary processing unit, a FPGA, or the like.

In one embodiment, the first method includes generating a unique key set identifier ("KSI") associated with a multi-access edge computing ("MEC") service of a mobile wireless communication network and derives a key for a network function of the mobile wireless communication network based on a corresponding root key and the generated KSI, the KSI provided as input to a key derivation function ("KDF"). In one embodiment, the first method includes transmitting an application registration request message to the network function for establishing a secure connection to the network function using the key, the application registration request message comprising the KSI.

In one embodiment, the network function is selected from the group comprising an edge configuration server ("ECS"), an edge enabler server ("EES"), and an edge application server ("EAS").

In one embodiment, the KSI that is generated for the associated MEC service is used to derive keys for each of the ECS, the EES, and the EAS network functions using the KDF.

In one embodiment, the first method includes generating the unique KSI for the associated MEC service and different unique KSIs to derive keys for each of the ECS, the EES, and the EAS network functions using the KDF.

In one embodiment, the corresponding root key is a key for one of an access and mobility management function ("AMF"), the ECS, and the EES.

In one embodiment, the KSI is valid for one or more of a duration of the MEC service that the KSI is associated with, until an access and mobility management function ("AMF") key is refreshed, and until the AMF is changed.

In one embodiment, the KSI is permanently assigned to the associated MEC service.

In one embodiment, the KSI is a value of a counter that is increased with each new KSI that is generated up to a maximum number of MEC services that can be simultaneously used.

In one embodiment, the KSI is a randomly generated number having a length that ensures a uniqueness of the random number relative to the number of available MEC services.

In one embodiment, the KSI is a static value that is pre-configured for the associated MEC service.

In one embodiment, the KSI is a character string derived from one of a name and a description of the associated MEC service.

Disclosed herein is a second apparatus for key identification for mobile edge computing functions, according to embodiments of the disclosure. In various embodiments, the second apparatus includes a network function, e.g., an AMF, executing on a network equipment apparatus 400, described above. In some embodiments, the second apparatus includes a processor, such as a microcontroller, a microprocessor, a CPU, a GPU, an auxiliary processing unit, a FPGA, or the like.

In one embodiment, the second apparatus includes a transceiver that receives a key request message from a first network function via a second network function of a mobile wireless communication network, the key request message comprising an application request message and a key set identifier ("KSI") associated with a multi-access edge computing ("MEC") service of the mobile wireless communication network. In one embodiment, the second apparatus includes a processor that derives a key for the first network function using an AMF key and the KSI as inputs to a key derivation function ("KDF"). In one embodiment, the transceiver transmits the key to the first network function, via the second network function.

Disclosed herein is a second method for key identification for mobile edge computing functions, according to embodiments of the disclosure. In various embodiments, the second method is performed by a network function, e.g., an AMF, executing on a network equipment apparatus 400, described above. In some embodiments, the second method is performed by a processor, such as a microcontroller, a microprocessor, a CPU, a GPU, an auxiliary processing unit, a FPGA, or the like.

In one embodiment, the second method includes receiving a key request message from a first network function via a second network function of a mobile wireless communication network, the key request message comprising an application request message and a key set identifier ("KSI") associated with a multi-access edge computing ("MEC") service of the mobile wireless communication network. In one embodiment, the second method includes deriving a key for the first network function using an AMF key and the KSI as inputs to a key derivation function ("KDF"). In one embodiment, the second method includes transmitting the key to the first network function, via the second network function.

Disclosed herein is a third apparatus for key identification for mobile edge computing functions, according to embodiments of the disclosure. In various embodiments, the third apparatus includes a network function, e.g., an ECS, an EES, or an EAS, executing on a network equipment apparatus 400, described above, which may be part of a mobile edge computing network. In some embodiments, the third apparatus includes a processor, such as a microcontroller, a microprocessor, a CPU, a GPU, an auxiliary processing unit, a FPGA, or the like.

In one embodiment, the third apparatus includes a transceiver that receives, from a user equipment ("UE") device, an application request message comprising a key set identifier ("KSI") associated with a multi-access edge computing ("MEC") service and a request for access to the MEC service. In one embodiment, the third apparatus includes a processor that generates a key request message comprising the application request message and the KSI. In one embodiment, the transceiver transmits the key request message to a first network function and receives a key from the first network function in response to the request. In one embodiment, the processor associates the received key to the MEC service of the application request message using the KSI.

In one embodiment, the network function apparatus comprises one of an edge configuration server ("ECS"), an edge enabler server ("EES"), and an edge application server ("EAS"), and the first network function comprises a corresponding one of a network exposure function ("NEF"), an ECS, and an EES.

Disclosed herein is a third method for key identification for mobile edge computing functions, according to embodiments of the disclosure. In various embodiments, the third method is performed by a network function, e.g., an ECS, an EES, or an EAS, executing on a network equipment apparatus 400, described above, which may be part of a mobile edge computing network. In some embodiments, the third method is performed by a processor, such as a microcontroller, a microprocessor, a CPU, a GPU, an auxiliary processing unit, a FPGA, or the like.

In one embodiment, the third method includes receiving, from a user equipment ("UE") device, an application request message comprising a key set identifier ("KSI") associated with a multi-access edge computing ("MEC") service and a request for access to the MEC service. In one embodiment, the third method includes generating a key request message comprising the application request message and the KSI. In one embodiment, the third method includes transmitting the key request message to a first network function and receives a key from the first network function in response to the request. In one embodiment, the third method includes associating the received key to the MEC service of the application request message using the KSI.

In one embodiment, the network function apparatus comprises one of an edge configuration server ("ECS"), an edge enabler server ("EES"), and an edge application server ("EAS"), and the first network function comprises a corresponding one of a network exposure function ("NEF"), an ECS, and an EES.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
at least one memory; and
at least one processor coupled with the at least one memory and configured to cause the UE to:
generate a unique key set identifier ("KSI") associated with a multi-access edge computing ("MEC") service;
derive a key for a network function based on a corresponding root key and the unique KSI, the unique KSI provided as input to a key derivation function ("KDF"); and
transmit an application registration request message to the network function for establishing a secure connection to the network function using the key, the application registration request message comprising the unique KSI.

2. The UE of claim 1, wherein the network function comprises an edge configuration server ("ECS"), an edge enabler server ("EES"), an edge application server ("EAS"), or a combination thereof.

3. The UE of claim 2, wherein the unique KSI is used to derive keys for each of the ECS, the EES, and EAS network functions using the KDF.

4. The UE of claim 2, wherein the at least one processor is configured to cause the UE to generate different unique KSIs to derive keys for each of the ECS, the EES, and EAS network functions using the KDF.

5. The UE of claim 2, wherein the corresponding root key is for one of an access and mobility management function ("AMF"), the ECS, and or the EES.

6. The UE of claim 1, wherein the unique KSI is valid for one or more of a duration of the MEC service, until an access and mobility management function ("AMF") key is refreshed, until the AMF is changed, or a combination thereof.

7. The UE of claim 1, wherein the unique KSI is permanently assigned to the MEC service.

8. The UE of claim 1, wherein the unique KSI is a value of a counter that is adjusted with each new generated unique KSI.

9. The UE of claim 1, wherein the unique KSI is a randomly generated number based in part on a number of available MEC services.

10. The UE of claim 1, wherein the unique KSI is a static value that is pre-configured for the MEC service.

11. The UE of claim 1, wherein the unique KSI is a character string derived from one of a name or a description of the MEC service.

12. A network equipment for wireless communication, comprising:

at least one memory; and
at least one processor coupled with the at least one memory and configured to cause the network equipment to:
receive a key request message from a first network function via a second network function, the key request message comprising an application request message and a key set identifier ("KSI") associated with a multi-access edge computing ("MEC") service;
derive a key for the first network function using an access and mobility management function ("AMF") key and the KSI as inputs to a key derivation function ("KDF"); and
transmit the key to the first network function, via the second network function.

13. The network equipment of claim 12, wherein the first network function comprises an edge configuration server ("ECS") and the second network function comprises a network exposure function ("NEF").

14. A network equipment for wireless communication, comprising:
at least one memory; and
at least one processor coupled with the at least one memory and configured to cause the network equipment to:
receive an application request message comprising a key set identifier ("KSI") associated with a multi-access edge computing ("MEC") service and a request for access to the MEC service;
generate a key request message comprising the application request message and the KSI;
transmit the key request message to a first network function;
receive a key from the first network function in response to the request; and
associate the key with the MEC service of the application request message using the KSI.

15. The network equipment of claim 14, wherein the network equipment comprises an edge configuration server ("ECS"), an edge enabler server ("EES"), an edge application server ("EAS"), or a combination thereof, and the first network function comprises a corresponding network exposure function ("NEF"), an ECS, an EES, or a combination thereof.

16. A method performed by a user equipment ("UE"), comprising:
generating a unique key set identifier ("KSI") associated with a multi-access edge computing ("MEC") service; and
deriving a key for a network function based on a corresponding root key and the unique KSI, the unique KSI provided as input to a key derivation function ("KDF"); and
transmitting an application registration request message to the network function for establishing a secure connection to the network function using the key, the application registration request message comprising the unique KSI.

17. The method of claim 16, wherein the network function comprises an edge configuration server ("ECS"), an edge enabler server ("EES"), an edge application server ("EAS"), or a combination thereof.

18. The method of claim 17, wherein the unique KSI is used to derive keys for each of the ECS, the EES, and EAS network functions using the KDF.

19. The method of claim 17, further comprising generating different unique KSIs to derive keys for each of the ECS, the EES, and EAS network functions using the KDF.

20. The method of claim 17, wherein the corresponding root key is for one of an access and mobility management function ("AMF"), the ECS, or the EES.

* * * * *